(12) United States Patent
Kueppers et al.

(10) Patent No.: US 10,989,580 B2
(45) Date of Patent: Apr. 27, 2021

(54) APPARATUS AND METHOD FOR FEEDING DOSES OF FLUIDISABLE MATERIALS

(71) Applicant: NORSK HYDRO ASA, Oslo (NO)

(72) Inventors: Hans Kueppers, Waldfeucht (DE); Elmar Wedershoven, Oberhaussn (DE); Simen Øystese, Øvre Ardal (NO)

(73) Assignee: NORSK HYDRO ASA, Oslo (NO)

( * ) Notice: Subject to any disclaimer, the term of this patent is extended or adjusted under 35 U.S.C. 154(b) by 0 days.

(21) Appl. No.: 16/344,116

(22) PCT Filed: Oct. 17, 2017

(86) PCT No.: PCT/NO2017/000026
§ 371 (c)(1),
(2) Date: Apr. 23, 2019

(87) PCT Pub. No.: WO2018/093268
PCT Pub. Date: May 24, 2018

(65) Prior Publication Data
US 2020/0064171 A1    Feb. 27, 2020

(30) Foreign Application Priority Data
Nov. 21, 2016   (NO) .................................. 20161850

(51) Int. Cl.
*G01F 11/34*        (2006.01)
*B65G 53/16*        (2006.01)
(Continued)

(52) U.S. Cl.
CPC .............. *G01F 11/34* (2013.01); *B65D 88/72* (2013.01); *B65G 53/16* (2013.01); *C25C 3/14* (2013.01)

(58) Field of Classification Search
CPC .......... G01F 11/34; G01F 11/40; G01F 11/46; G01F 13/001; B65D 88/72; B65D 88/548;
(Continued)

(56) References Cited

U.S. PATENT DOCUMENTS 2,245,664 A    6/1941  Gronert
2,715,781 A    8/1955  Sproul
(Continued)

FOREIGN PATENT DOCUMENTS

CN    200995880    12/2007
CN    102234024    11/2011
(Continued)

OTHER PUBLICATIONS

International Search Report dated Jan. 16, 2018 in International Application No. PCT/NO2017/000026.
(Continued)

*Primary Examiner* — Paul R Durand
*Assistant Examiner* — Andrew P Bainbridge
(74) *Attorney, Agent, or Firm* — Wenderoth, Lind & Ponack, L.L.P.

(57) ABSTRACT

Apparatus for feeding doses of fluidisable materials comprising one upper Intel pipe (1', 1"), one lower outlet pipe (2', 2") and a Pausing (6',6"). and a fluidising element (5',5") for controlling outflow of materials through the outlet pipe (2', 2"), The apparatus further comprising a control volume constituted by a chamber (3',3") between the Intel pipe (1', 8") and the outlet pipe (2',2") and a fluidising element (4', 4") for controlling inflow of materials Into the chamber (3', 3"). A diverter (7',7") la arranged between the Inlet pipe (1', 8") and the outlet pipe {2', 2") defining said chamber (3', 3") between said Inlet pipe (1',8") diverter (7',7") the housing (6', 6") and the fluidising element (5',5"). The Invention also
(Continued)

Figure 1:
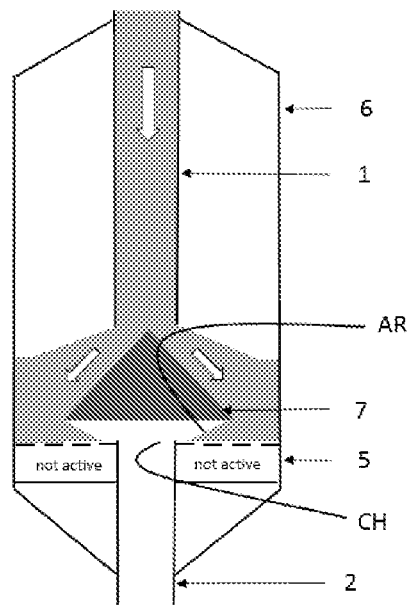

relates to a method for feeding doses of fluidisable materials by the apparatus.

10 Claims, 7 Drawing Sheets

(51) Int. Cl.
*B65G 53/66* (2006.01)
*C25C 3/14* (2006.01)
*B65D 88/72* (2006.01)

(58) Field of Classification Search
CPC ........ B65G 53/16; B65G 53/18; B65G 53/66; B65G 53/04; B65G 53/22; B65G 43/08; B65G 69/06; C25C 3/14
USPC ................ 222/630, 195, 209, 637; 422/171; 34/178–179; 406/10–33, 86–92, 138
See application file for complete search history.

(56) References Cited

U.S. PATENT DOCUMENTS

| | | | |
|---|---|---|---|
| 3,540,633 A * | 11/1970 | Eckhardt | B65D 88/72 406/138 |
| 3,995,771 A * | 12/1976 | Olivier | B65G 53/50 222/61 |
| 4,279,549 A * | 7/1981 | Hanrot | B65G 53/66 406/14 |
| 4,490,077 A * | 12/1984 | Shimada | G01F 1/74 406/124 |
| 4,692,068 A * | 9/1987 | Hanrot | B65G 53/22 406/89 |
| 4,930,691 A * | 6/1990 | Nagell | B65G 53/22 222/630 |
| 5,299,694 A * | 4/1994 | Rambaud | B03B 4/02 209/135 |
| 5,718,873 A * | 2/1998 | Wellwood | B01D 53/08 422/171 |
| 6,000,995 A * | 12/1999 | Ruholl | B24C 5/04 451/2 |
| 7,789,103 B2 * | 9/2010 | Memory | A01C 7/102 137/515.5 |
| 8,360,691 B2 * | 1/2013 | Moretto | B65G 53/66 406/17 |
| 2004/0247400 A1 * | 12/2004 | Cloue | C25C 3/14 406/10 |
| 2011/0017786 A1 | 1/2011 | Hamel et al. | |
| 2014/0348597 A1 * | 11/2014 | Moretto | B65G 43/08 406/31 |
| 2020/0064171 A1 * | 2/2020 | Kueppers | B65G 53/16 |

FOREIGN PATENT DOCUMENTS

| | | |
|---|---|---|
| DE | 1268062 | 5/1968 |
| WO | 2010/114382 | 10/2010 |

OTHER PUBLICATIONS

Written Opinion of the International Searching Authority dated Jan. 16, 2018 in International Application No. PCT/NO2017/000026.

* cited by examiner

APPARATUS AND METHOD FOR FEEDING DOSES OF FLUIDISABLE MATERIALS

The present invention relates to an apparatus and a method for feeding doses of fluidisable materials. More specific, the invention relates to a feeder and a method for feeding fluidisable powder materials, such as alumina and fluoride. In particular, the feeder is designed for maintenance free feeding of alumina and/or fluoride to electrolysis cells of the Hall-Hérouit type with prebaked anodes for aluminium production.

The present feeder comprises at least the following main components; an inlet pipe—and an outlet pipe arranged in a housing and further one diverter and a fluidising element. The fluidising element is arranged close to one inlet opening of the outlet pipe and allows materials to be delivered into and through the outlet pipe when activated. The components mentioned may preferably have a circular cross section. Further said components may be arranged coaxially in the housing, which itself preferably have a mainly cylindrical shape. The arrangement of the inlet/outlet pipes, the diverter and the fluidising element allows the material to flow in three dimensions which has shown to give very stable results with regard to ability to reproduce equal dose sizes. Further, the feeder has a volumetric chamber that defines the amount of material that can be delivered by activating the mentioned fluidising element. In at least one embodiment the feeder comprises two fluidising elements coaxially arranged in the housing and spaced at a distance. One upper fluidising element then fills the defined chamber with materials—the second one empties the chamber content through the outlet pipe. The chamber represents a control volume where the feeder then is of a so called volumetric type. The chamber size (volume) is mainly given by the chamber geometry, such as the dimension of the housing, the arrangement of the inlet pipe, the outlet pipe, the diverter and the lower fluidising element, but can also to a certain degree be adjustable, for instance by adjusting the insertion depth of the inlet pipe.

In the prior art, several feeder designs have been proposed. In U.S. Pat. No. 4,930,691 there is disclosed a pneumatic dosimeter for providing dosages of pulverulent materials, for instance for supplying aluminum oxide and fluoride to an aluminum electrolytic cell. The dosimeter comprises a vessel with an upper chamber which at the bottom is provided with a fluidizing device in the form of a fluidizing canvas with an underlying chamber which is connected to an air source via a pipe line. The vessel is provided with an inlet for the supply of pulverulent material from a supply tank or hopper to the upper chamber, and an outlet opening for discharging the chamber. At least one fluidizing channel or pipe is provided between the supply tank and the vessel. This channel is provided with a fluidizing wall or fluidizing canvas which is connected to an air supply source through a pipe line. The filling and emptying of the chamber is carried out by solenoid valves which are provided in the pipe line connected to the vessel and the pipe line connected to the channel, respectively. The solenoid valves are controlled by a PLS governor or a processor such that air is supplied to the channel and the vessel according to a preferred time and frequency program.

US 2011/0017786 A1, CN 102234024 A and CN 200995880 Y relates to metering or dispensing devices for materials where the amount of fluidising gas and/or the period of its activation will influence the metered amount of material. These publications do not disclose feeders with a control volume.

One problem with available time controlled feeders for powder materials, even feeders provided with a control volume, is that the size of the dosages leaving the apparatus, may have too high variance, thus causing process variations.

Other drawbacks that may influence feeders;

Too high capacity on filling and discharge side of the element

Control system limitations—too long activation time to be accurate enough for small dosages Start and stop conditions dominate the total variation of dosage Hydrostatic pressure influence the variation and stability of the feeding Pressure build-up in de-aerating system Risk of uncontrolled self-feeding Control volume in existing system makes it hard to set the dosage time Poor stability and repeatability after commissioning, i.e. the set dosage time has to be corrected after start-up A control volume can represent 15-20 doses in total in its chamber and as a process controller it often gives very small doses at the end of each cycle, where the chamber is emptied. This can easily create AE (anodic effects) or PFC (perfluorocarbons) gases.

Materials are transported in mainly 2-D, i.e. first by one conveyer to the upper part of a control volume and down into it, and as second 2-D transport further down from the control volume onto one other conveyer and to the electrolysis cell Transport in a two-dimensional fluidized element may be influenced by "wall-effects", i.e. friction against the side wall of the element, that may cause inaccuracy in transport volume.

As an aluminium producer increase its focus to improve the output of the pots (the electrolysis cells), and also to diminishing the inter-polar distance, the need for accuracy in feeding the pots is continuously increasing.

According to the present invention there are several advantages;

Accurate dose sizes (STD<3%)

Maintenance free (over years)

Minor influence of activation time (stable doses over wide time range)

Minor influence of fluidization pressure (stable doses over wide pressure range)

Fluidizing pressure in lower fluidizing element (pad) does not influence the feeding accuracy (only time of emptying the feeder channel)

Dose accuracy less independent on powder properties (oxide, fluoride)

Silent operation (no noise)

Transport of powder in three dimensions (3-D)

Little or negligible friction in dosing apparatus

This and further advantages can be achieved in accordance with the invention as defined in the accompanying claims.

Figure 2:
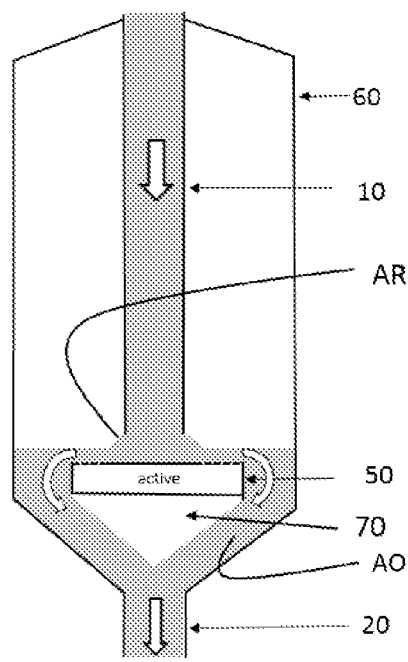
Figure 3:
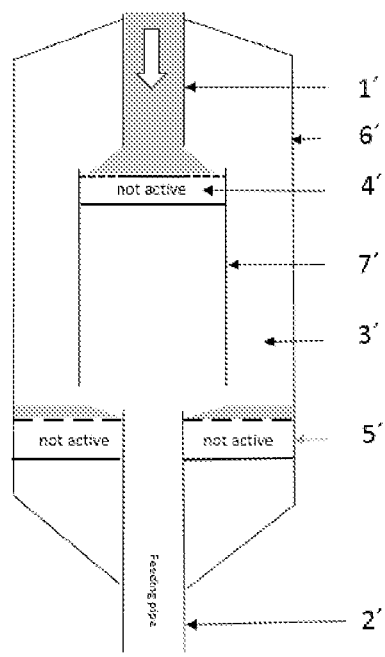
Figure 4:
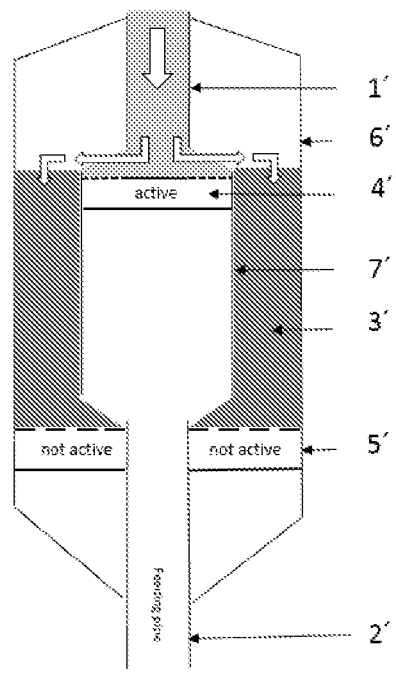
Figure 5:
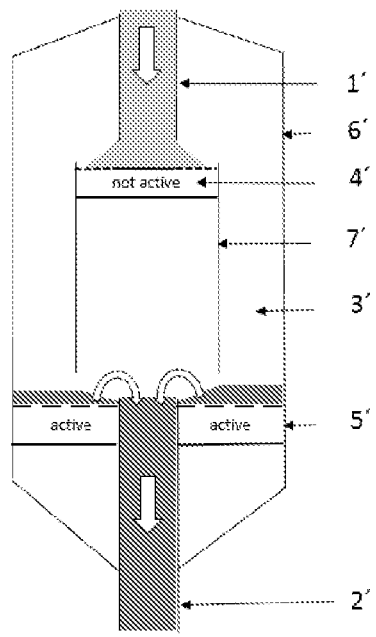
Figure 6:
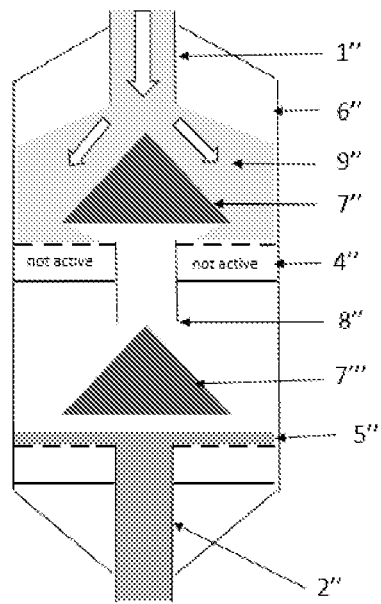
Figure 7:
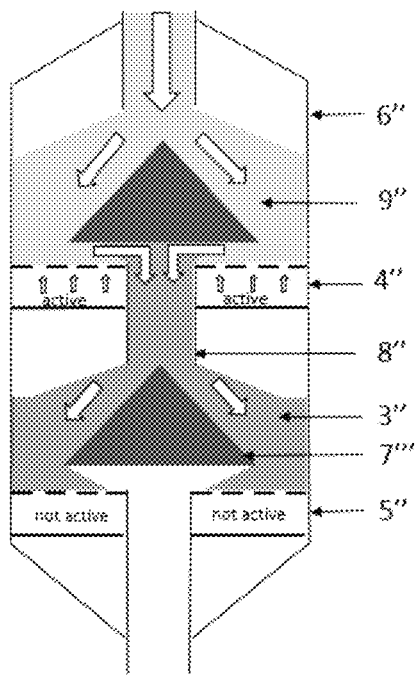
Figure 8:
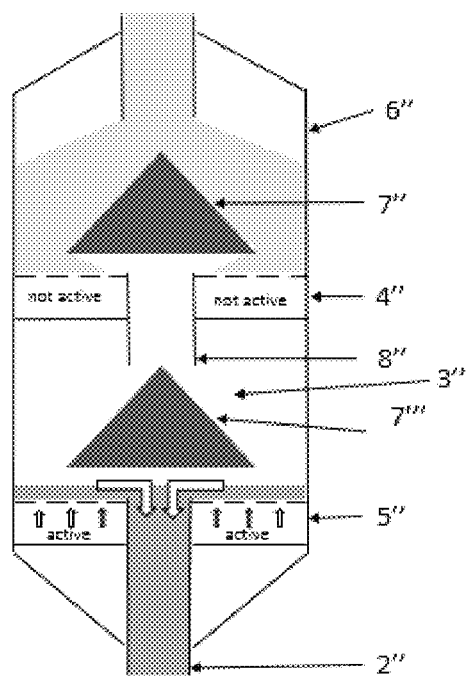
Figure 9:
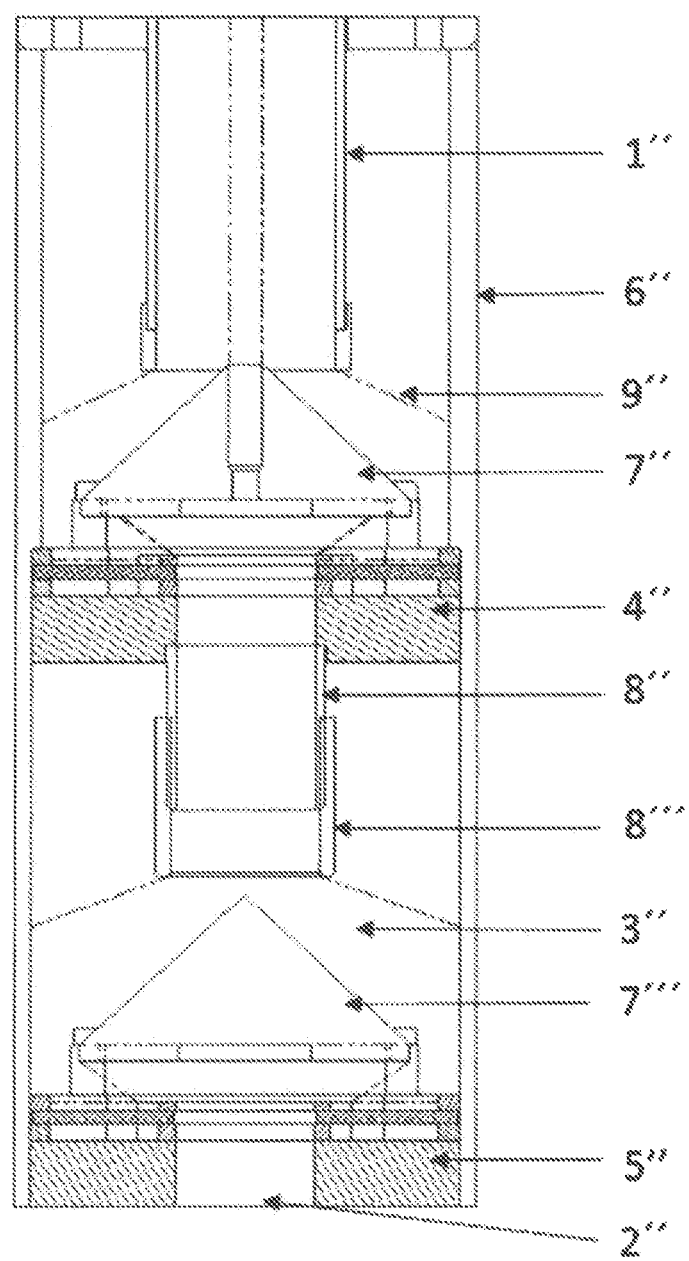
Figure 10:
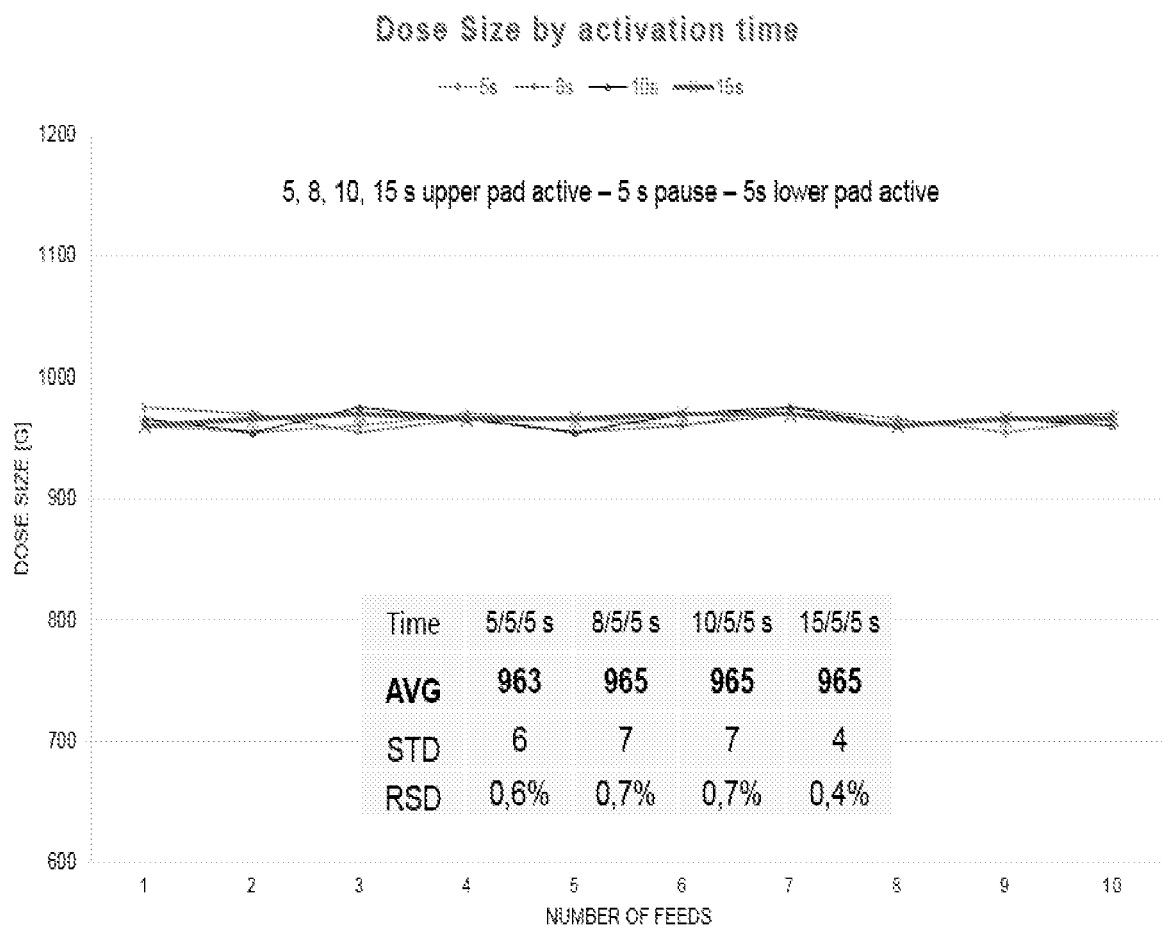
Figure 11:
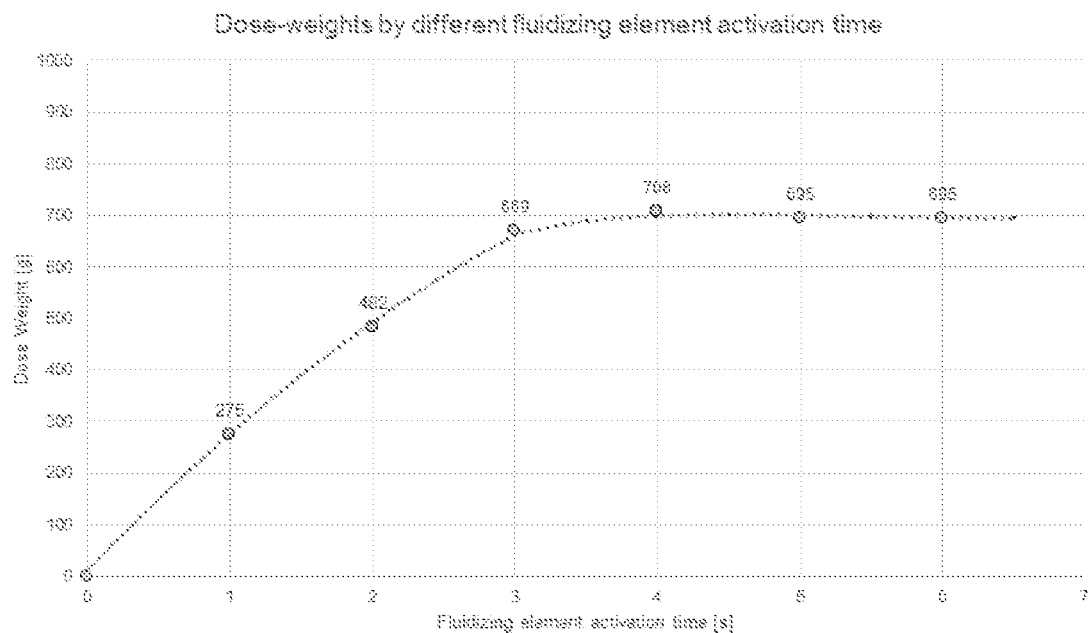
Figure 12:
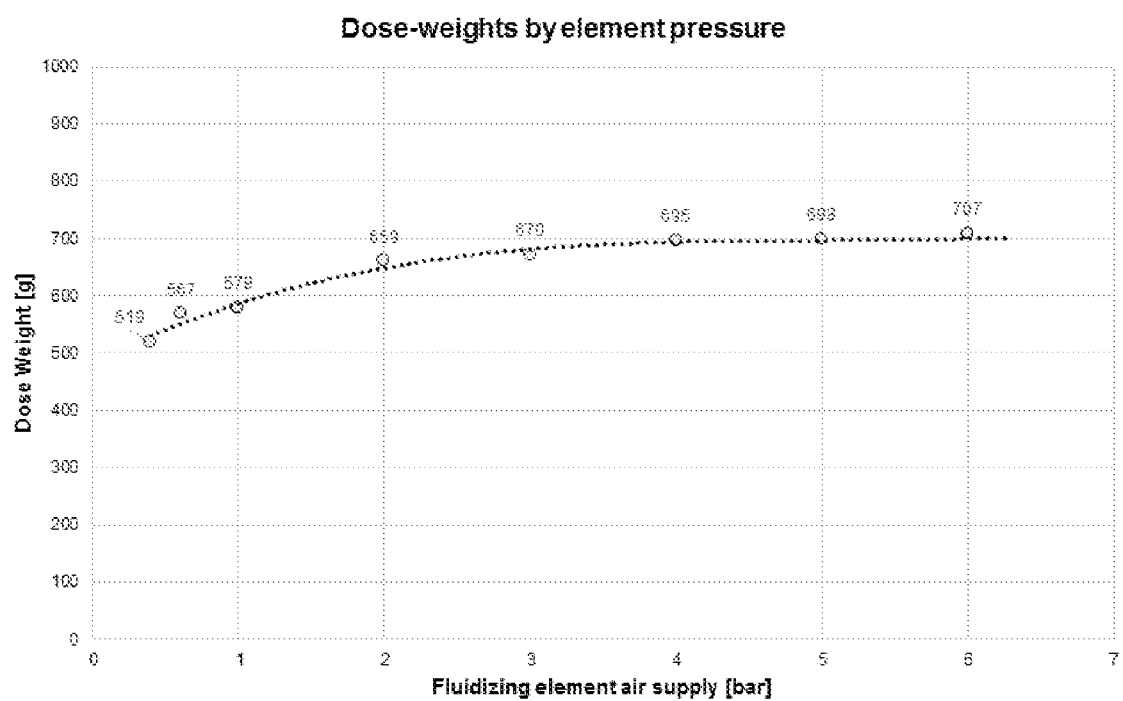

The present invention shall be further explained by examples and figures where:

FIGS. 1 and 2 disclose some basic principles applied by the invention related to controlling the transport of the material where in particular, FIG. 1 discloses in a cross sectional view, a first basic design of an apparatus for feeding (time controlled) doses of fluidisable powder material (a feeder) without a control volume, FIG. 2 discloses in a cross sectional view, a second basic design of a feeder or an apparatus for feeding (time controlled) doses of fluidisable powder materials, without a control volume, FIG. 3 discloses in a cross sectional view, a first embodiment of the invention where an apparatus for feeding doses of fluidisable powder materials is in starting modus, the feeder having a control volume or a volume chamber, FIG. 4 discloses in a cross sectional view, where the apparatus for feeding doses of fluidisable powder materials as shown in FIG. 3 is in filling modus, FIG. 5 discloses in a cross sectional view, the apparatus for feeding doses of fluidisable powder materials as shown in FIG. 3, in feeding modus, FIG. 6 discloses in a cross sectional view, the principle of a second embodiment of an apparatus for feeding doses of fluidisable powder materials in starting modus, the feeder having a control volume or a volume chamber, FIG. 7 discloses in a cross sectional view, the apparatus for feeding doses of fluidisable powder materials as shown in FIG. 6, in filling modus, FIG. 8 discloses in a cross sectional view, the apparatus for feeding doses of fluidisable powder materials as shown in FIG. 6, in feeding modus, FIG. 9 discloses in a cross sectional view, a first technical implementation (prototype) of the feeding unit, similar to that of the second embodiment (FIG. 6-8), FIG. 10 discloses the performance of a prototype feeder in accordance with the invention, FIG. 11 discloses the performance of a prototype feeder in accordance with the invention, FIG. 12 discloses the performance of a prototype feeder in accordance with the invention.

In FIG. 1 there is shown in a cross sectional view, a first basic design of an apparatus for feeding doses of fluidisable powder materials, comprising one upper vertical inlet pipe 1 that receives material from a reservoir, an air side or the like (not shown) and one lower vertical outlet pipe 2. The inlet pipe 1 and the outlet pipe 2 are coaxially arranged in a housing 6 with a distance between them. It is also disclosed one fluidising element 5 for controlling outflow of materials via the outlet pipe as well as a flow diverter 7 arranged above the fluidising element. The fluidising element is not activated in this Figure. The cone shaped diverter 7 has a circular shape and controls the material flow from the inlet pipe onto the ring shaped fluidising element and towards the inner wall of the housing 6. The fluidising element has one outer periphery that lays onto the inner wall of the housing and has a central hole CH that corresponds to the inlet opening of the outlet pipe 2. Due to the materials angle of repose AR and the radial extent of the diverter, material will not enter the said inlet opening unless the fluidising element is activated. The flow will be radially towards the hole and downwardly, i.e. in three dimensions. The fluidising element 5, the flow diverter 7 and the central hole CH form together what can be defined as a material lock, that can allow materials to flow or to be restricted from flowing. This feeder apparatus does not have a control volume.

In FIG. 2 there is shown in a cross sectional view, a second basic design of an apparatus for feeding doses of fluidisable powder materials, comprising one upper vertical inlet pipe 10 that receives material from a reservoir or the like (not shown) and one lower vertical outlet pipe 20. The inlet pipe 10 and the outlet pipe 20 are coaxially arranged in a housing 60 with a distance between them. It is also disclosed one fluidising element 50 for controlling outflow of materials via the outlet pipe 20. The housing and also the fluidising element may be circular. As in the above design, the components can be coaxially arranged. The Figure shows the fluidising element 50 in an active state, and that materials flow from the inlet pipe and in a radial direction towards an annular opening between the inner wall of the housing 60 and the fluidising element 50 and further downwards into a cone shaped part of the housing. The powder material flows out into an annular opening AO of the outlet pipe 20. Optionally, a flow diverter 70 constituted by a cone with its tip pointing downwards can be attached at the underside of the fluidizing element 50. This feeder apparatus does not have a control volume.

Due to the materials angle of repose AR and the radial extent of the fluidising element 50, the distance between the outlet of pipe 10 to the fluidising element, material will not enter the said inlet opening unless the fluidising element is activated. Similar to that of FIG. 1 there is established a material lock by the means as mentioned above.

In FIG. 3 there is shown in a cross sectional view, a first embodiment of an apparatus for feeding (volumetric) doses of fluidisable powder materials, comprising one upper vertical inlet pipe 1' and one lower vertical outlet pipe 2' and a control volume constituted by a chamber 3' between the inlet pipe 1' and the outlet pipe 2'. It is also disclosed one fluidising element 4' similar to that of fluidising element 50 in FIG. 2, for controlling inflow of materials into the chamber 3' and one fluidising element 5' similar to that of fluidising element 5 in FIG. 1, for controlling outflow of materials from the chamber. The inlet pipe 1' and the outlet pipe 2' are coaxially arranged in a housing 6'. A flow diverter 7' is arranged between the inlet pipe 1' and the outlet pipe 2' defining said chamber 3' between said diverter 7' and the housing 6'. The diverter 7' has a cylindrical shape in this embodiment. The fluidising element 4' is circular-shaped and arranged at a substantially horizontal top surface of the diverter 7'.

When activating the fluidising element 4' (see FIG. 4), it will be able to generate a transport into the chamber 3' in a 360° sector and down into it, thus representing a transport in 3' dimensions, 3-D.

Thus, by activating fluidising element 4', the angle of repose of the powder material changes and it starts to flow into chamber 3' and will be resting on the lower fluidising element 5' that is not activated. The chamber will be filled up with fluidised powder material and the fluidising element 4' is then switched to inactive, see FIG. 5.

Then, as further shown in FIG. 5, by activating the lower fluidising element 5' the fluidised powder material flows out through the vertical outlet pipe 2' and to a receiver such as an electrolysis cell (not shown). This amount of material available in the chamber 3' will represent the control volume. The volume can be emptied in one shot where the fluidising element is activated a time period long enough for that purpose.

As an alternative, the fluidising element can be activated in relative short periods at a frequency controlled by a control unit, for instance a pot controller. The dose size will then be dependent upon the activation time period of the fluidising element, in this situation, it is possible to monitor the total amount of fluidised material dosed, during a time period for instance 24 hours. This can be done by recording the number of cycles the control volume has been completely emptied after being topped up, and multiply this number with the size of the control volume.

The fluidising element 5' is able to generate a transport from the chamber 3' mainly radially in a 360° sector and down into the outlet pipe 2', thus representing a transport in 3 dimensions, 3-D. There will be little or negligible friction between the material and the apparatus during this transport.

In FIG. 6 there is shown in a cross sectional view, a second embodiment of an apparatus for feeding (volumetric) doses of fluidisable powder materials. The material is falling down by gravity through the upper pipe 1" onto the upper fluidizing element 4" and is filling an upper chamber 9" between outer housing 6", that can be cylindrical, and a flow diverter 7", which is conically shaped. The filling stops when the material reaches the upper pipe's 1" outlet end. The lower part of the apparatus is quite similar to that as shown in FIG. 1, having a conical flow diverter 7''', a corresponding fluidizing element 5" and outlet pipe 2".

FIG. 7, discloses the embodiment of an apparatus for feeding doses of fluidisable powder materials as shown in FIG. 6, in a filling modus. The fluidising element 4" activates inflow of fluidized materials into the dose chamber 3" where the material is resting on the lower fluidising element 5" that is not activated. After the dose chamber 3" is filled up by reaching inlet pipe level 8", the fluidising element 4" is switched to inactive. The filling level can be registered by commonly available level irrigating means.

FIG. 8 discloses the feeding modus of the apparatus. In this embodiment the total control volume is emptied in one shot and thus represents a dose. By activating the lower fluidising element 5" the fluidised material flows out through the vertical outlet pipe 2", to a receiver such as an electrolysis cell (not shown). This is the dose volume. The dose size (volume) is then mainly given by the geometrical characteristics of the chamber 3" such as the diameter of the housing 6" and the insertion height of the inlet pipe 8", but also the design of the conical flow diverter and the fluidising element 5" such as the diameter of the hole CH. Here a shorter pipe that is terminated higher up in the chamber 3" will increase the dose volume, while on the other hand a longer insertion of the pipe will decrease the dose volume.

FIG. 9 shows in a cross sectional view, a realized prototype, similar to that of the fourth embodiment as described above. The cone shaped flow diverters 7" and 7''' above each of fluidising elements 4" and 5" respectively, leads the material outwards to the wall of housing 6". The angle of repose prevents an outflow of non-fluidised material given by the vertical distance of the cone to fluidising element and its radial extend versus the periphery of the outlet pipes. When the fluidising element is activated, the angle of repose changes and material flows out through the outlet pipe. The fluidising elements 4" and 5" being able to generate a transport radially into the inlet 8" and outlet pipes 2" in a 360° sector and down into it, thus representing a transport in 3 dimensions, 3-D.

The inlet pipe 8" can be provided with means for prolongation/retraction, for instance by means of a movable sleeve 8''' arranged onto the pipe, so that the spacing between the outlet thereof and the diverter 7''' can be adjusted. This will affect the volume of materials that can be received in chamber 3".

FIG. 10 discloses the performance of a prototype feeder in accordance with the invention as shown in FIG. 9, where the dose size accuracy by activation time period of the fluidising element.

The fluidisation elements are activated by 6 bar air pressure supply in different time steps. The feeding time (emptying the dose chamber 3") is fixed to 5 s. The time (pause) between activation of the filling element and the feeding element is fixed to 5 s as well. The activation time for the filling element has been varied with 5 s, 8 s, 10 s and 15 s. All measured cycles showed stable and repeatable dose weights (of 965 g). Standard deviation 4-7 g (or <1%).

FIG. 11 discloses the performance of a prototype feeder in accordance with the invention as shown in FIG. 9 as average doze sizes versus different activation time period: The fluidizing elements (in this feeder geometry, FIG. 9) needs~3.5 s to fill a chamber. A longer activation time will not change the dose size. (An activation time<3.5 s leads to smaller doses.)

FIG. 12 discloses the performance of a prototype feeder in accordance with the invention as shown in FIG. 9 as average dose sizes by different fluidising pressure: The fluidisation of alumina (and the feeding) starts on relatively low pressure air supply (<1 bar). After operating with air pressure on the fluidizing elements>3.5 bar, the fluidisation and powder flow stabilises. Higher air pressure will not change the dose size significant.

There are several benefits inherent by the present invention due to that fact that it is practically maintenance free because of no moving parts and no wear.

The disclosed feeding principle will (compared to current feeding systems in electrolysis cells) sustain more stabilized dose sizes by less influence of;
Air pressure varies
Time settings and -resolution
Fluidizing and flow-properties of the material In addition the invention is represented by small geometric shape compared to its dosing capacity, simple standard parts and materials and can be operated at low fluidizing air pressure while having minor de-aeration air issues.

The invention claimed is:

1. An apparatus for feeding doses of fluidisable materials comprising one inlet pipe (1', 8"), one lower outlet pipe (2', 2") and a housing (6', 6"), and a fluidising element (5', 5") for controlling outflow of materials through the outlet pipe (2', 2"), and further comprising a control volume constituted by a chamber (3', 3") between the inlet pipe (1', 8") and the outlet pipe (2', 2"), and a fluidising element (4', 4") for controlling inflow of materials into the chamber (3', 3"),
wherein a diverter (7', 7''') is arranged between the inlet pipe (1', 8") and the outlet pipe (2', 2") defining said chamber (3', 3") between said inlet pipe (1', 8"), diverter (7', 7'''), the housing (6', 6") and the fluidising element (5', 5"), and that the diverter (7', 7'), the inlet pipe (1', 8"), the outlet pipe (2', 2") and the fluidising element (5', 5") for controlling outflow of materials through the outlet pipe (2', 2") are coaxially arranged in the housing (6', 6").

2. The apparatus for feeding doses of fluidisable materials according to claim 1,
wherein the diverter (7', 7''') has a circular shape and is arranged in the housing (6', 6") at a position below the inlet pipe (1', 8") and has a diameter that is larger than the inlet opening of the outlet pipe (2', 2"), and further being arranged at a vertical distance above the fluidising element (5', 5"), thereby restricting materials to enter the outlet pipe unless the fluidising element (5', 5") being activated.

3. The apparatus for feeding doses of fluidisable materials according to claim 1,
wherein
the diverter (7') is cylindrical wherein the fluidising element (4') for controlling inflow of materials into the chamber (3') is arranged at top of the diverter.

4. The apparatus for feeding doses of fluidisable materials according to claim 1,
wherein the diverter (7''') is conically shaped with its tip pointing upwards.

5. The apparatus for feeding doses of fluidisable materials according to claim 4,
wherein
upstream the chamber (3") there is an upper chamber (9") that is filled via upper pipe (1"), where flow from the upper chamber (9") into chamber (3") via inlet pipe (8") is controlled by a flow diverter (7") and the fluidising element (4").

6. The apparatus for feeding doses of fluidisable materials according to claim 5,
wherein
the inlet pipe (8") can be adjusted vertically with regard to the flow diverter (7''') or being provided with a telescopic part (8''').

7. The apparatus for feeding doses of fluidisable materials according to claim 1,
wherein
the fluidising element (5', 5") is shaped as an annular ring with its outer periphery abutting the inner wall of the housing (6', 6") and further being provided with a central circular hole (CH) communicating with an inlet opening of the outlet pipe (2', 2").

8. A method for feeding doses of fluidisable materials by the apparatus as defined in claim 1,
wherein
the materials are metered based upon time period control.

9. The method for feeding doses of fluidisable materials according to claim 8,
wherein
the materials are metered based upon volumetric control.

10. The method for feeding doses of fluidisable materials according to claim 9,
wherein
the amount of material dosed can be metered by periodically filling/emptying a defined volume chamber (3', 3"), that can be emptied by feeding one large dose corresponding to the volume of the chamber(3', 3") or several small doses.

* * * * *